US012793263B2

(12) United States Patent
Van Der Tempel et al.

(10) Patent No.: US 12,793,263 B2
(45) Date of Patent: Nov. 10, 2026

(54) METHOD FOR SIMULTANEOUS LOCALIZATION AND MAPPING

(71) Applicant: Voxelsensors SRL, Brussels (BE)

(72) Inventors: Ward Van Der Tempel, Keerbergen (BE); Christian Mourad, Genval (BE)

(73) Assignee: Voxelsensors SRL, Brussels (BE)

( * ) Notice: Subject to any disclaimer, the term of this patent is extended or adjusted under 35 U.S.C. 154(b) by 176 days.

(21) Appl. No.: 18/861,174

(22) PCT Filed: Apr. 25, 2023

(86) PCT No.: PCT/EP2023/060741

§ 371 (c)(1),
(2) Date: Oct. 28, 2024

(87) PCT Pub. No.: WO2023/213610

PCT Pub. Date: Nov. 9, 2023

(65) Prior Publication Data

US 2025/0292429 A1 Sep. 18, 2025

(30) Foreign Application Priority Data

May 2, 2022 (EP) .................................... 22171113

(51) Int. Cl.
*G06T 7/73* (2017.01)
*G06T 7/246* (2017.01)

(52) U.S. Cl.
CPC ................ *G06T 7/74* (2017.01); *G06T 7/248* (2017.01); *G06T 2207/30241* (2013.01)

(58) Field of Classification Search
CPC ........................................................ G06T 7/74
See application file for complete search history.

(56) References Cited

U.S. PATENT DOCUMENTS

| | | | |
|---|---|---|---|
| 12,217,380 B2 * | 2/2025 | Upendran | ............... G06T 19/20 |
| 2008/0310757 A1 | 12/2008 | Wolberg et al. | |
| 2018/0005015 A1 | 1/2018 | Hou et al. | |
| 2018/0012371 A1 | 1/2018 | Klingner et al. | |

(Continued)

OTHER PUBLICATIONS

International Preliminary Report on Patentability and Written Opinion dated Oct. 29, 2024, for PCT Application PCT/EP2023/060741, filed Apr. 25, 2023, seven pages.

*Primary Examiner* — Oneal R Mistry
(74) *Attorney, Agent, or Firm* — Morrison & Foerster LLP

(57) ABSTRACT

The present invention relates to a method for sensing. The method comprises the step of identifying a second set of locations (2) of points of at least one object (3) in a scene (4) within a second time window (T2), with respect to a first reference point (28), such as preferably a first viewpoint. The method further comprises the step of converting said second set of locations (2) to a second set of 3D positions (6). The method further comprises the step of determining a transformation to said second set of 3D positions (6), such that said transformed second set of 3D positions (6) is a best fit to a first set of 3D positions (5), wherein said first set of 3D positions (5) is denser than said second set of 3D positions (6), and wherein said first set of 3D positions (5) is within a first time window (T1) prior to said second time window (T2), and wherein said second time window (T2) is shorter than said first time window (T1), preferably at least two times shorter.

20 Claims, 6 Drawing Sheets

(56) References Cited

U.S. PATENT DOCUMENTS

| | | | | |
|---|---|---|---|---|
| 2020/0284913 | A1* | 9/2020 | Amelot | G01S 7/4808 |
| 2024/0037765 | A1* | 2/2024 | Zuo | G06T 3/14 |
| 2024/0104771 | A1* | 3/2024 | Zelek | G06T 7/579 |
| 2024/0310851 | A1* | 9/2024 | Ebrahimi Afrouzi | G01S 17/87 |

* cited by examiner

METHOD FOR SIMULTANEOUS LOCALIZATION AND MAPPING

CROSS REFERENCE TO RELATED APPLICATIONS

This application is a U.S. national stage application under 35 U.S.C. § 371 of International Application No. 22171113.8, filed internationally on May 2, 2022.

TECHNICAL FIELD

The present invention relates to a method for simultaneous localization and mapping (SLAM). In particular, the present invention relates to a low latency method for SLAM.

BACKGROUND

Different approaches are described in the art for acquiring 3D information of an environment and objects in said environment, for example for the purpose of creating an augmented reality of said environment. Simultaneous Localization and Mapping (SLAM) allows to construct a map of said environment and objects therein, and localize a sensor or a camera within said map.

The problem with the standard SLAM method is that it is slow in processing changes of positions or orientation of objects in a scene. For example, every time an object moves from one point to another, then it is needed to scan the full scene, and therefore scan all points defining said object, in order to find out the new location and orientation of said object. This means that the full scene i.e. each and every point of said scene and points of objects in said scene, need to be scanned, every time a movement occurs. This is disadvantageous since it is not an efficient process and consumes a lot of power. This is further disadvantageous since it is a slow process, which causes a lot of latency.

Another disadvantage is that, if an object moved very fast in a scene, the standard SLAM method cannot quickly find out the new position and orientation of said object. Instead, there will be a delay between the actual movement of said object, and the moment the method finds out the new position and orientation of said object. This causes confusion for the user when using said method for augmented reality. This may furthermore cause motion sickness if objects are moving too fast, since 1) the user perceives said objects in a delayed manner from the actual movement, and 2) since the objects would look like they are rapidly changing their position in an unrealistic way. Furthermore, it would not be possible to view objects moving in a smooth way in said scene, unless when they are moving very slow.

Furthermore, for an object moving very fast in a scene, scanning the scene for all points defining said object may result in a non-complete scan, since the object may move before the scanning is finished. This may cause the user to see only a part of the object, and even worse: to see one object being in two different positions of said scene, since the object has moved before the scanning of the scene was finished, which again causes the user to view a distorted, blurred and confusing representation.

There is, therefore, a need for an improved SLAM method that is fast and efficient, as well as a system using said method.

The present invention aims to resolve at least some of the problems mentioned above.

SUMMARY OF THE INVENTION

It is an object of embodiments of the present invention to provide low latency, fast, accurate, and efficient sensing, e.g. optical sensing, preferably for simultaneous localization and mapping (SLAM). The above objective is accomplished by a method, sensor, device, and system according to the present invention.

In a first aspect, the present invention relates to a method for sensing, e.g. optical sensing, preferably for simultaneous localization and mapping (SLAM), comprising the steps of:

a) identifying a second set of locations of points of at least one object in a scene within a second time window with respect to a first reference point, such as preferably a first viewpoint; and b) converting said second set of locations to a second set of 3D positions, characterized in that the method further comprises the steps of:

c) determining a transformation to said second set of 3D positions, such that said transformed second set of 3D positions is a best fit to a first set of 3D positions, wherein said first set of 3D positions is denser than said second set of 3D positions (6), and wherein said first set of 3D positions is obtained within a first time window prior to said second time window, and wherein said second time window is shorter than said first time window, preferably at least two times shorter.

Step (c) is preferably (but not necessarily) done by calculating a third set of 3D positions, by determining a transformation of said second set of 3D positions, such that said third set of 3D positions is a best fit to said first set of 3D positions.

It is an advantage of embodiments of the present invention that a low latency and efficient method for SLAM is obtained. It is an advantage of embodiments of the present invention that a smooth movement of objects is obtained. It is an advantage of embodiments of the present invention that the user perceives movement of objects in a scene with minimal to no delay. It is an advantage of embodiments of the present invention that motion sickness is prevented. It is an advantage of embodiments of the present invention that realistic movement of objects in perceived by users. It is an advantage of embodiments of the present invention that a blurred or distorted or incomplete view of objects in a scene by the user is prevented.

It is an advantage of embodiments of the present invention that only partial identification of current locations of points defining an object is needed. It is an advantage of embodiments of the present invention that only partial identification of objects is needed, allowing low latency and efficient mapping and localization of said objects. It is an advantage of embodiments of the present invention that, although only partial identification of objects and of locations of points defining an object is needed, an accurate identification is still obtained. It is an advantage of embodiments of the present invention that the need for identifying all points defining an object is eliminated. It is an advantage of embodiments of the present invention that not all points of an object need to be repeatedly identified at every instance. It is an advantage of embodiments of the present invention that points in said second set of 3D positions are much fewer than points in said first set of 3D positions, preferably at least two times fewer, more preferably at least five times fewer, even more preferably at least ten times fewer, and still more preferably at least twenty times fewer, and again more preferably at least fifty times fewer, and most preferably at least hundred times fewer, and therefore finding said transformed second or third set of 3D positions to be a best fit of said first set of 3D points is a fast, power efficient, and low latency step. This method is further advantageous for lowering the power consumption, since in the second time window, not all points defining an object need to be identified, i.e. said second or third set of 3D positions is sufficient for fitting to said first set of 3D positions.

It is an advantage of embodiments of the present invention that unknown current locations of points defining an object are obtained based on previous locations of points defining said object. It is an advantage of embodiments of the present invention that changes to a location of an object i.e. to locations of points defining said objects, occurring within very short time windows (e.g. shorter than 100 microseconds), can be identified.

It is an advantage of embodiments of the present invention that continuous localization of objects in said scene is obtained. It is an advantage of embodiments of the present invention that quasi-continuous mapping of objects in said scene is obtained, quasi- in a sense that the update of the map and localization is significantly faster than the motion of objects and/or observer.

It is an advantage of embodiments of the present invention that rotation of objects and points defining said objects are calculated. It is an advantage of embodiments of the present invention that points defining said objects are adjusted based on a change of orientation of said object.

It is an advantage of embodiments of the present invention that both translation and rotation of objects between said first time window and second time window is obtained.

It is an advantage of embodiments of the present invention that, using a sparse data set and a dense data set, it is possible to map the environment of a user, and identify a pose or a head pose of said user in a digital environment, in low latency. This low latency is particularly advantageous in head-mounted display applications.

Preferred embodiments of the first aspect of the invention comprises one or a suitable combination of more than one of the following features.

The method preferably further comprises the steps of:

identifying a first set of locations of points of said at least one object in said scene within said first time window, with respect to said first reference point, and converting said first set of locations to said first set of 3D positions.

The method preferably further comprises the step of:

supplementing said second set of 3D positions with said first set of 3D positions.

It is an advantage of embodiments of the present invention that said first set of 3D positions is reliable for supplementing said second set of 3D positions. It is an advantage of embodiments of the present invention that said second set of 3D positions may be constructed based on said first set of 3D positions.

The method preferably further comprises the steps of:

illuminating a dot on said scene along an illumination trace, preferably in a Lissajous fashion, monitoring said dot, identifying said first and said second set of locations along said trace, with respect to said first reference point, identifying a third set of locations along said trace, with respect to a second reference point, within said first time window, said second reference point is preferably a second viewpoint, identifying a fourth set of locations along said trace, with respect to said second reference point, within said second time window, triangulating said first and third set of locations to obtain said first set of 3D positions, and triangulating said second and fourth set of locations to obtain said second set of 3D positions.

It is an advantage of embodiments of the present invention that points of said second set of locations (or said fourth set of locations) along said trace are much fewer than points of said first set of locations (or said third set of locations) along said trace. It is an advantage of embodiments of the present invention that only points along said trace are identified, allowing low latency, fast, and efficient mapping and localization of said objects, in an accurate manner.

It is an advantage of embodiments of the present invention that said trace covers for example at most 20% of said scene during said second time window, preferably at most 10%, more preferably at most 5%, even more preferably at most 2%, most preferably at most 1%.

It is an advantage of embodiments of the present invention that the need for illuminating all the scene and identifying all points of objects in said scene is eliminated. It is an advantage of embodiments of the present invention that by only partially monitoring said scene, it is possible to obtain information about objects in all of said scene. It is an advantage of embodiments of the present invention that different areas of said scene are monitored equally or almost equally. It is an advantage of embodiments of the present invention that different areas of said scene have equal or almost equal chances of being scanned by said dot, especially in said Lissajous fashion.

It is an advantage that only one method (in this case, only triangulation) is used for obtaining the first and second set of 3D positions, since this allows to obtain a simpler, fast, and efficient method, in comparison to other methods that uses two different methods to obtain the dense and sparse 3D sets of data.

The method preferably further comprises the steps of:

defining a first set of lines by consecutive points of said first set of 3D positions, defining a second set of lines by consecutive points of said second set of 3D positions, and determining a transformation to said second set of lines, such that said second set of lines is a best fit to said first set of lines.

It is an advantage of embodiments of the present invention that an accurate fitting of said second set of 3D positions to said first set of 3D positions is obtained.

The method preferably further comprises the steps of:

dividing said second time window into sub windows, wherein each of said sub windows comprises a sub set of 3D positions, and calculating, for each of said sub set of 3D positions, a corresponding transformed set of 3D positions, wherein each of said transformed set of 3D positions is obtained by transforming said second set of 3D positions in said sub window, such that each transformed set of 3D positions is a best fit to the first set of 3D positions.

It is an advantage of embodiments of the present invention that changes of locations of points defining an object, or rotation of said object, occurring within a very short time window can still be identified. It is an advantage of embodiments of the present invention that objects moving or rotating very fast in said scene can still be monitored.

It is an advantage of embodiments of the present invention that the method allows flexibility to consider all of said second time window, or to consider one or more sub windows, depending on the need, and depending on movement or rotation of said objects in said scene.

The method steps preferably further comprises the steps of:

extrapolating a predicted set of 3D positions for an upcoming time instance based on said second set of 3D positions and said first set of 3D positions, wherein said extrapolation comprises identifying a trajectory of said object between said first time window and said second time window, identifying a real set of 3D positions, and validating said predicted set by at least partial comparison with said real set.

It is an advantage of embodiments of the present invention that a set of 3D positions of an object for an upcoming detection is predicted. It is an advantage of embodiments of the present invention that movement of an object in a scene is predicted before actually happening. It is an advantage of embodiments of the present invention that a fast and low latency mapping is obtained, while still obtaining a high accuracy mapping. It is an advantage of embodiments of the present invention that inaccurate identifications of points (e.g. false positives) are filtered out.

The method preferably further comprises the step of combining said first and second time windows and points thereof. It is an advantage of embodiments of the present invention that more dense data comprising many points defining said object within a longer time window is obtained.

In a second aspect, the present invention relates to an optical sensor for simultaneous localization and mapping (SLAM), comprising:

a first plurality of pixel sensors, each pixel sensor comprising a photo detector, and a processing unit, wherein said photo detectors of said first plurality are adapted to output a second set of locations of points of at least one object in a scene within a second time window, with respect to said first plurality, wherein said unit is adapted to convert said second set of locations to a second set of 3D positions, characterized in that said unit comprises a processor determining in use a transformation to said second set of 3D positions, such that said second set of 3D positions is a best fit to a first set of 3D positions, wherein said first set of 3D positions is denser than said second set of 3D positions, and wherein said first set of 3D positions is within a first time window prior to said second time window, and wherein said second time window is shorter than said first time window, preferably at least two times shorter, and preferably wherein said first set of 3D positions is retrieved from a storage location, such as preferably a local or cloud based storage location.

Preferred embodiments of the second aspect of the present invention comprise:

said photo detectors of said first plurality are further adapted to output a first set of locations of points of said at least one object in said scene within said first time window, wherein said unit is further adapted to convert said first set of locations to said first set of 3D positions, and the sensor further comprises primary optics able to produce an image of said scene on said first plurality of pixel sensors.

In a third aspect, the present invention relates to an optical sensing device for simultaneous localization and mapping (SLAM), comprising said optical sensor according to the second aspect, wherein said device further comprises at least one light source, wherein said light source is adapted to illuminate at least one dot on said scene along an illumination trace, preferably in a Lissajous fashion, wherein said device further comprises a second plurality of pixel sensors, each pixel sensor comprising a photo detector, wherein said photo detectors of the first plurality are adapted to monitor said dot and output said first and second set of locations along said trace, and wherein said photo detectors of the second plurality are adapted to monitor said dot and output a third set of locations of points of said object along said trace within said first time window and a fourth set of locations of points of said object along said trace within said second time window, with respect to said second plurality, wherein said unit is capable of triangulating said first and third sets of locations to obtain said first set of 3D positions, and wherein said unit is capable of triangulating said second and fourth sets of locations to obtain said second set of 3D positions.

Preferred embodiments of the third aspect of the present invention comprises one or a suitable combination of more than one of the following features:

said device further comprises at least one memory element, wherein said element is adapted to store at least said first set of 3D positions and/or said second set of 3D positions, said unit is capable of extrapolating a predicted set of 3D positions for an upcoming instance based on said second set of 3D positions and said first set of 3D positions, wherein said unit is capable of identifying a trajectory of said object between said first time window and second time window, wherein said unit is further capable of validating said predicted set by comparing with a real set of 3D positions.

In a fourth aspect, the present invention relates to an optical sensing system for simultaneous localization and mapping (SLAM), comprising said optical sensing device according to the third aspect, wherein said system further comprises secondary optics able to produce an image of said scene on said second plurality of pixel sensors.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

DESCRIPTION OF THE FIGURES

The disclosure will be further illustrated by means of the following description and the appended figures.

Figure 1:
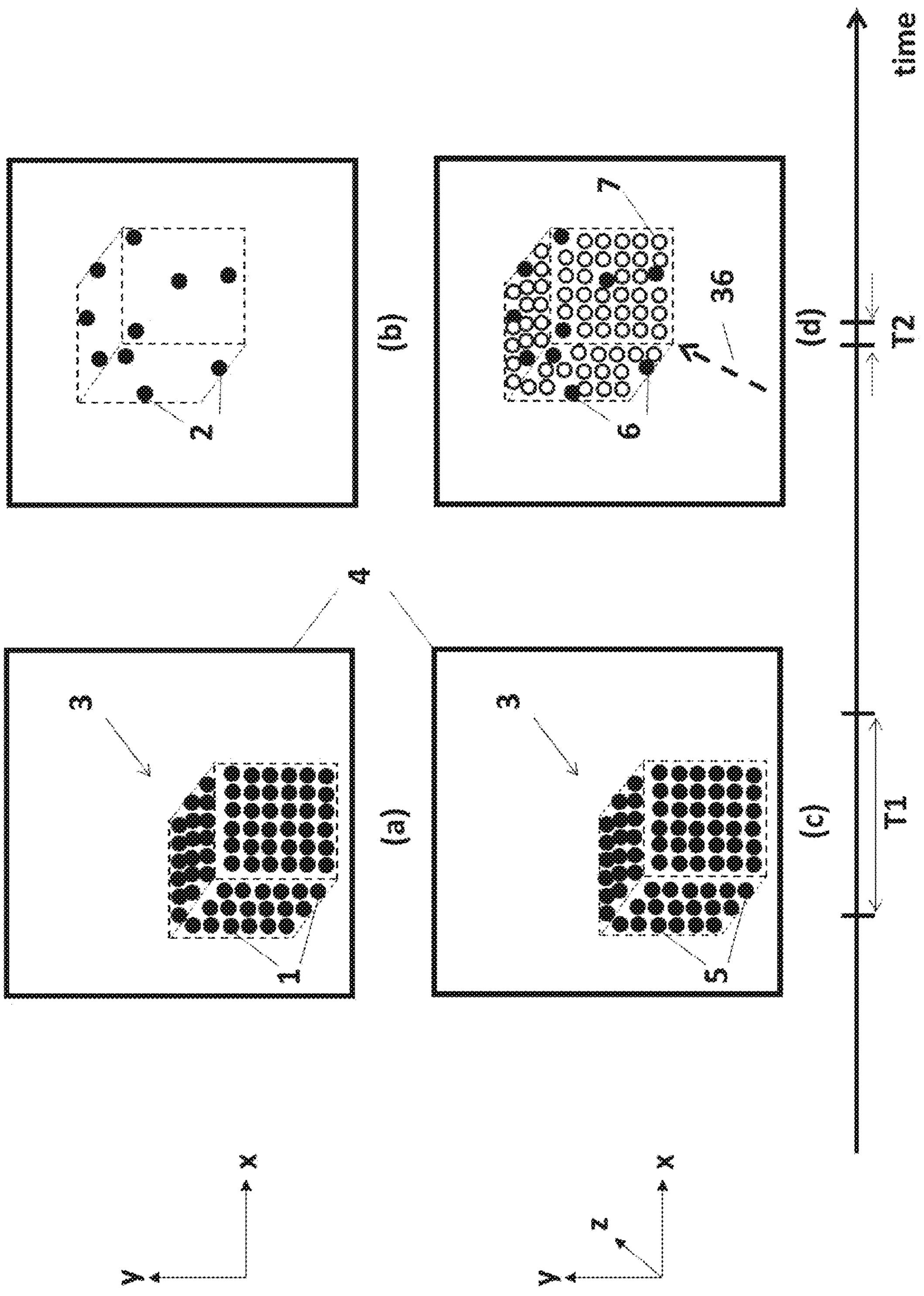
FIG. 1 shows in (a, b) a first set of locations (1) and a second set of locations (2) of points of an object (3) in 2D, and in (c, d) a first set of 3D positions (5) and a second set of 3D positions (6) in 3D, according to embodiments of the present invention.

Any reference signs in the claims shall not be construed as limiting the scope. In the different drawings, the same reference signs refer to the same or analogous elements.

DETAILED DESCRIPTION

The present invention relates to a method and optical sensor for sensing, e.g. optical sensing, preferably for simultaneous Localization and Mapping (SLAM), with low latency.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the description provided herein, numerous specific details are set forth. However, it is understood that embodiments of the invention may be practiced without these specific details. In other instances, well-known methods, structures and techniques have not been shown in detail in order not to obscure an understanding of this description.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings: "A", "an", and "the" as used herein refers to both singular and plural referents unless the context clearly dictates otherwise. By way of example, "a contaminant" refers to one or more than one contaminant.

The recitation of numerical ranges by endpoints includes all numbers and fractions subsumed within that range, as well as the recited endpoints.

In a first aspect, the present invention relates to a method for sensing, e.g. optical sensing, preferably for simultaneous localization and mapping (SLAM).

The method comprises the step of (a) identifying a second set of locations of points of at least one object in a scene within a second time window. Said set comprises for example points defining said object, for example points indicating that said object is present at one part of the scene, for example identifying points that define a contour of an object.

The method further comprises the step of (b) converting said second set of locations to a second set of 3D positions. For example, said second set of 3D positions have depth information, for example x-y-z information about each point defining said at least one object.

The method further comprises the characterizing step of (c) determining a transformation to said second of 3D positions, such that said transformed second set of 3D positions is a best fit to a first set of 3D positions, wherein said first set of 3D positions is denser than said second set of 3D positions i.e. said first set of 3D positions comprises more points than said second set of 3D positions. Said first set of 3D positions is obtained within a first time window prior to said second time window.

Step (c) is preferably done by calculating a third set of 3D positions, by determining a transformation of said second set of 3D positions, such that said third set of 3D positions is a best fit to said first set of 3D positions. For example, fitting or matching said third or second set of 3D positions to said first set of 3D positions, wherein said third set of 3D positions is a transformed version of said second set of 3D positions. This is not a point-to-point mapping, but a matching step of the overall second or third set of 3D positions with the overall first set of 3D positions e.g. matching a group of points to another group of points. For example, to allow similar points of said objects to be matched to each other as a group. Matching or fitting may be at least 80% accurate, preferably at least 90%, more preferably at least 95%, most preferably at least 98%.

Matching or fitting in this invention is preferably done by matching or fitting sparse set of data points to dense set of data points This is because it is cheaper, easier and faster to transform and fit a sparse set of points to a dense set of points, compared to transforming and fitting a dense set of points to a sparse set of points. This is also because the dense data set may in many cases represent the whole world e.g. the whole digital world, while the sparse data set represents part of said world e.g. at which the user is looking. However, in principle, both approaches are possible.

Matching with this high accuracy rate is possible since objects do not move very fast between said first and second time windows. For example, the time between the end of said first time window and the beginning of said second time window is typically 0 millisecond in which the windows abut, however the windows can also overlap in time, for instance 100 microseconds to 1 millisecond overlap time, or a gap may exist between the windows, as an example between 100 microseconds to 1 millisecond.

Said first set of 3D positions is preferably retrieved from a storage location, such as preferably a local or a cloud-based storage location.

Said second time window being shorter than the first time window, preferably at least two times shorter, or more than two times shorter. The ratio between said second time window to said first time window may be between 1:2 and 1:100, preferably between 1:5 and 1:50, more preferably between 1:10 and 1:20. The skilled person appreciates that the ratio between the second time window and the first time window depends on the speed of movement of objects, depending on the application. For example, more points are identified in the first window than the second window. For example, the sampling rate in both the first and second window is the same, however due to the longer length of the first time window, more points are identified in said first time window than in the second time window.

The width of said second time window is long enough to identify a fraction of the number of points relative to the dense representation obtained from the first time window. The number of points in said second time window is at most equal to the number of points in said first time window, preferably at most 50%, more preferably 10%, most preferably at most 5%. For example, the second time window may be at most 5 milliseconds, preferably 1 millisecond, more preferably at most 100 microseconds.

Said second set of locations is identified with respect to a first reference point, such as, preferably, a first viewpoint. Said reference point may also be for example the location of a system carrying out said method, or for example a viewpoint of a sensor in said system. This allows to identify objects in said scene with respect to said reference point, which allows to map all objects in said scene, for example build a map of objects in the scene, preferably all objects in the scene, and further localize the system carrying out said method in said scene. Said at least one object is preferably a plurality of objects.

The method preferably further comprises the steps of identifying a first set of locations of points of said at least one object in said scene within said first time window, with respect to said first reference point, and converting said first set of locations to said first set of 3D positions. Said first and second set of locations are in 2D (i.e. 2-dimensional), for example in the x-y-axis, for example each point has an x-coordinate and a y-coordinate. The first set of locations is the dense set of data, and the second set of locations is the sparse set of data.

As mentioned above, step (c) is preferably done by determining a transformation of said second set of 3D positions to obtain said third set of 3D positions. For example, determining a translation (i.e. movement in x-y-z) and/or rotation (i.e. change of orientation) of said second set of 3D positions corresponding to a translation and/or rotation of said at least one object to obtain said third set of 3D positions, that allow to obtain a best fit to said first set of 3D positions. For example so as to obtain information about movement and/or rotation of objects in a scene between said time window and said second time window. For example, in order to determine an orientation change of said at least one object, with respect to a reference orientation or a reference axial system, for example x-y-z axial system. For example, in case the orientation of said object is changed with respect to at least one axis.

Determining said translation and/or rotation is preferably done incrementally. For example, an initial translation and/or rotation estimation is determined, after which said transformed second or third set of 3D positions is fitted or matched to said first set of 3D positions. In case however the initial translation and/or rotation is not successful, then the process of matching or fitting is continued by correcting or improving said translation and/or rotation estimation. This may be repeated until said matching succeeds, or until the best matching is obtained, or until a percentage error is obtained e.g. a minimum error. For example, a percentage error in matching said transformed second or third set of 3D positions to said first set of 3D positions may be tolerated.

Calculating a change of orientation e.g. a rotation of an object is important since at least some points defining said object may not be identifiable e.g. they may disappear due to said rotation, e.g. they may be identifiable during said first time window, but not during said second time window. On the other hand, at least some other points defining said object may appear due to said rotation, e.g. they may be identifiable during said second time window, but not during said first time window. Therefore, calculating said orientation facilitates matching in an accurate way, for example by adjusting the points defining an object e.g. by adjusting points in said first and/or second set of 3D positions, based on said change of orientation.

Said method and transformation is preferably performed on rigid bodies, for example, bodies that do not deform. For example, a box or a cylinder, which may move and/or rotate in the scene, but normally would not deform i.e. would not change their shape. However, this invention would still work for non-rigid bodies, for example by identifying a new first set of locations and a new first set of 3D positions in a more frequent manner than in the case of rigid bodies. For example, in the case of an inflating balloon, the transformation allows not only translation and/or rotational changes of objects, but also non-rigid deformations.

After determining the transformation, it is known where the object has moved and how it was rotated. The object can therefore be defined mainly based on said transformed second or third set of 3D positions, without the need to identify all the points of said object during said second time window. This allows fast, smooth, and low latency mapping and localization of objects in a scene. In other words, using a sparse data set e.g. said second set of 3D positions, it is possible to map the environment of a user using the method, and identifying the location of the user in said environment, with ultra-low latency. Using said sparse data set, it is also possible to identify a head pose of said user in said environment e.g. digital environment, for example where the user is looking at, with ultra-low latency.

It is noteworthy that the sparse data set may be representing the scene (e.g. in scene coordinates), while the dense data set may be representing the world (e.g. in world coordinates). For example, considering a room or a given space, the dense data comprises data representing said room e.g. all objects and e.g. walls of said room, for example defined with respect to a reference point in world coordinates. However, the sparse data set comprises data representing a scene or a portion of said room, for example a scene where the user of said method is looking at, in scene or sensor coordinates. This is particularly advantageous following reasons. First, the sparse data set is transformed and fitted to the dense data set, for example the method tries to find the best fit in the world coordinates for the scene e.g. where the scene is located in the room. Secondly, finding the best fit allows to find the location of the user of the method in the world coordinates, as well as the head pose of the user i.e. where the user is looking at.

Preferably, the method further comprises the step of supplementing said second set of 3D positions with said first set of 3D positions. Based on the accuracy of the best fit in step (c), the step of supplementing can also be accurate. This is advantageous in eliminating the need to identify the missing points in said second set of 3D positions during said second time window since they can be obtained and supplemented by said first set of 3D positions. In other words, supplementing allows constructing said second set of 3D positions based on said first set of 3D positions, which allows low latency and efficient SLAM.

Preferably, the ratio of the number of points in said second set of 3D positions to the number of points in said first set of 3D positions is between 1:2 and 1:50, preferably between 1:10 to 1:20.

Preferably, the method is performed continuously. This is advantageous in allowing continuous localization and mapping of said scene and objects therein.

Preferably, the method steps may further comprise the step of illuminating a dot on said scene along an illumination trace. For example, said dot is illuminated by a light source, for example a dot source. For example, a mechanism (e.g. a MEMS mirror) moves said dot to illuminate different portions of said scene. Said illumination trace is preferably continuous, but not necessarily, for example it may also be switching on and off.

The method steps may further comprise the step of monitoring said dot. For example, monitoring said dot by a sensor looking at said scene.

The method steps may further comprise the step of identifying said first and said second set of locations along said trace, with respect to said first reference point. The method steps may further comprise the step of identifying a third set of locations along said trace, with respect to a second reference point, within said first time window. The second reference point is preferably a second viewpoint. The method steps may further comprise the step of identifying a fourth set of locations along said trace with respect to said second reference point, within said second time window. The difference between said third set of locations and said first set of locations is that they are identified from different reference point e.g. said second and first reference points, respectively. For example, both first and third set of locations are identified within said first time window, and having much more points than said second and fourth said of locations due to said first time window being longer than said second time window. Said fourth set of locations and said second set of locations are also different in that they are identified from a different reference point e.g. said second and first reference points, respectively.

The method steps may further comprise the step of triangulating said first and third set of locations to obtain said first set of 3D positions. The method steps may further comprise the step of triangulating said second and fourth set of locations to obtain said second set of 3D positions. Said first and third set of locations allow triangulation to obtain said first set of 3D positions. For example, by monitoring said dot and identifying points along said trace, it is possible to associate points of one set of locations at one reference point with corresponding points in the other set of locations at the other reference point. This allows to obtain depth information about objects in said scene.

Said illumination trace is also advantageous in that only said points along said trace are identified within said second time window, which allows low latency mapping, for example not all points in said scene are identified. Said trace also covers only portion of the scene during said second time window, for example only at most 20% or at most 10% of said scene, and preferably at most 5%, and more preferably at most 2%, and most preferably at most 1%. Similarly, at future time windows, it is only needed to identify points along said trace, as it is only needed occasionally to identify points along a longer time window e.g. said first time window.

Preferably, future time windows e.g. third and fourth and fifth time windows and sets of locations identified through these time windows may be combined to obtain a new set of locations comprising many points defining said object within a longer time window. Said new set of locations may be then converted to 3D positions and used for mapping 3D positions in future time windows.

Preferably, said first set of 3D positions may be updated regularly. For example, said first set of 3D positions is updated after a predetermined time period, for example by identifying a new set of points within a third time window adapted to be long enough, similarly to said first time window, to identify many points of an object e.g. a new dense set of 3D points, so as to allow matching or fitting of a new sparse set of 3D points to said new dense set of 3D positions. In other words, a new dense set of data may be obtained and used for matching or fitting a new sparse set of data thereto, after every predetermined time period.

Preferably, said dot may be sparsely illuminated on said scene. For example, illuminating only certain parts of said scene and identifying said points along said illumination trace caused by said dot within a predetermined time window. For example, illuminating said certain parts in such a way that points of objects in different portions of said scene, for example in any portion of said scene, may be identified. However, said identification of said points is done in a coarse manner, for example such that only partial identification of points of said object in said scene is done, for example if an object is defined by 100 points, then only part of these points are identified, e.g. at most 5 points or at most 10 points or at most 20 points. By identifying these points, it is possible to identify the overall shape or the contours of said object in a rough way. In a prior time window, a denser scan of said dot is done, in which more points are identified of said object, for example for an object having 100 points, at least 80 points are identified, for example at least 90 points, for example at least 95 points, for example at least 98 points. By first converting said points from 2D to 3D, and mapping the former group of points defining said object (comprising e.g. 5 or 10 points) to the latter group of points (comprising e.g. 95 or 98 points), it is possible to obtain supplementary points based on said latter group (i.e. the dense group) to supplement said former group (i.e. the sparse group). It is noteworthy that said supplementary points are based on said latter group (i.e. the dense group), but are not necessarily exact points taken from said latter group (i.e. the sparse group). For example, if an object rotates, some supplementary points may have to be adjusted.

Preferably, said dot may be illuminated in a Lissajous fashion, since said fashion allows coarse identification of points defining an object without having to identify every single points of said object, every single time. Lissajous fashion is one example, but the same effect can be obtained by other sparse illuminations such as raster scan. This is advantageous in obtaining low latency and efficient method for SLAM. This is also advantageous in allowing any object in any point of said scene to be identified, for example an object at the right side of said scene and the same object at the left side of said scene may have similar number of points identified, due to the similar scanning pattern of said dot at the different parts of said scene. Further advantages of said Lissajous fashion are shown below and in the figures.

Figure 2:
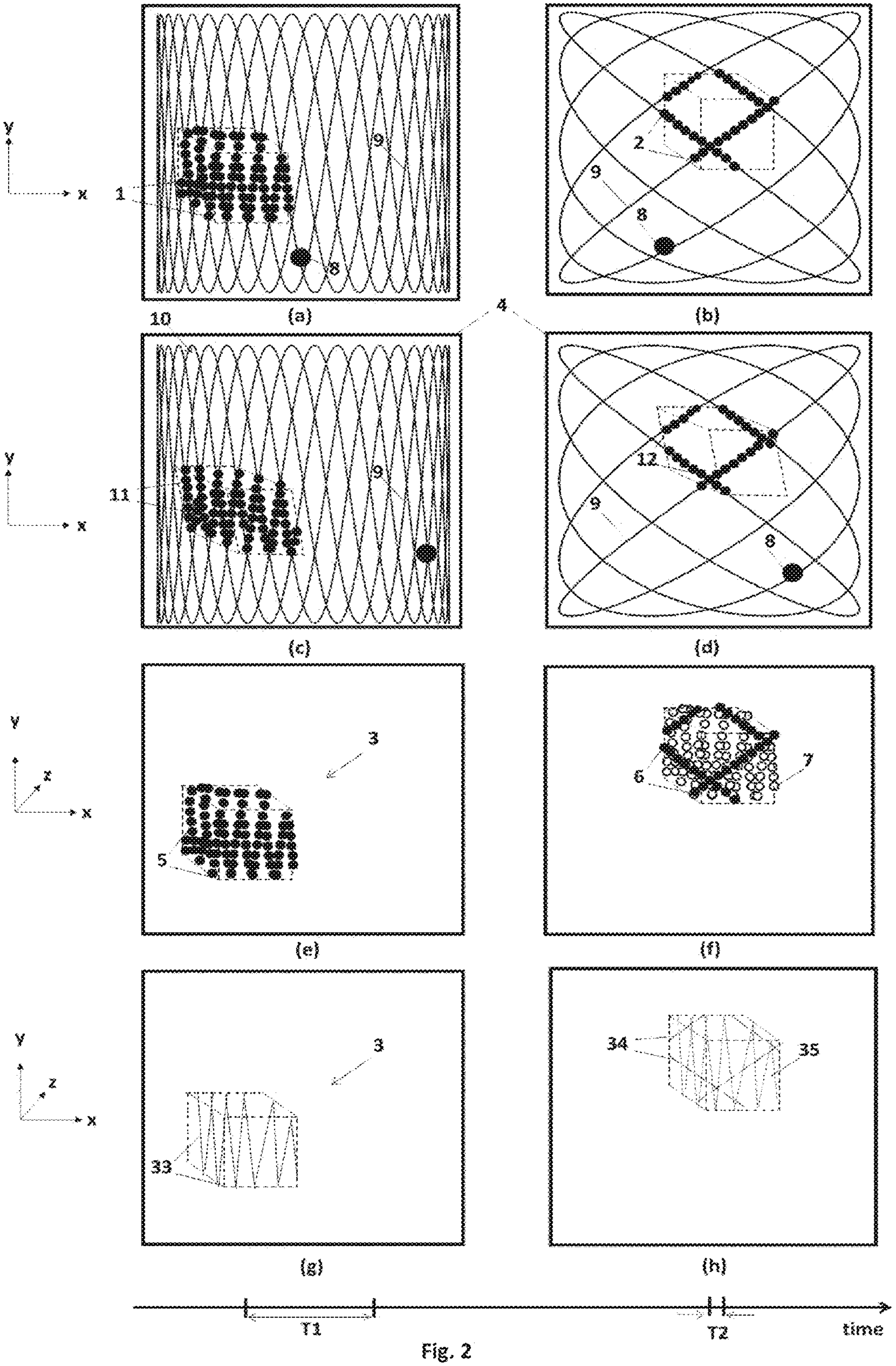
FIG. 2 shows in (a, b) a first set of locations (1) and a second set of locations (2) of points of an object (3) in 2D, with respect to a first reference point (28), along an illumination trace (9), and in (c, d) a third set of locations (11) and a fourth set of locations (12) of points of an object (3) in 2D, with respect to a second reference point (29), and in (e, f) a first set of 3D positions (5) and a second set of 3D positions (6) in 3D, as a result of triangulating said first and third set of locations (1, 11) and said second and third set of locations (2, 12) respectively, and shows in (g, h) matching or fitting a third set of lines (35) which is a transformation of a second set of lines (34) to said first set of lines (33), such that said third set of lines (35) is a best fit to a first set of lines (33), according to embodiments of the present invention.

Preferably, the method may further comprise the step of defining a first set of lines by consecutive points of said first set of 3D positions. The method further comprises the step of defining a second set of lines by consecutive points of said second set of 3D positions. For example, said consecutive points may be consecutive points on a Lissajous trace, wherein for example each line crosses said object one time. This is also illustrated in FIG. 2 (g, h). Since said lines are 3D lines, it is evident that said lines may or may not be straight lines.

The method may further comprise the step of determining a transformation of said second set of lines, such that said second set of lines is a best fit to said first set of lines. Finding the best fit or match between two sets of lines may be more accurate and/or easier than finding the best fit or match between two sets of points. This may be done by calculating a third set of lines, where said third set of lines being a transformed version of said second set of lines.

This step may therefore comprise determining a transformation of said second set of lines to obtain said third set of lines, such that said third set of lines is a best fit to said first set of lines. For example, determining a translation (i.e. movement in x-y-z) and/or rotation (i.e. change of orientation) of said second set of lines corresponding to a translation and/or rotation of said at least one object to obtain said third set of lines, that allow to obtain a best fit or match to said first set of lines.

Preferably, the method may further comprise the step of dividing said second time window into sub windows, wherein each of said sub windows comprises a sub set of 3D positions, for example a subset of 3D position corresponding to a sub set of locations identified in each of said sub windows. The method may further comprise the step calculating, for each of said sub set of 3D positions, a corresponding transformed set of 3D positions, wherein each of said transformed set of 3D position is obtained by transforming said second set of 3D positions in said sub window, such that each transformed set of 3D positions is a best fit to the first set of 3D positions.

Dividing said second time window into sub windows allows obtaining information about an object moving or rotating very fast in a scene, for example by obtaining information of said object at each of said sub windows. For example, by fitting each of said subset of 3D positions at each of said sub windows to said first set of 3D positions. Depending on the speed of movement or rotation of said object, 3D positions within one or more of said sub windows may be considered for said fitting.

Preferably, the number of points in a sub set of 3D positions within a very short sub window may need to be higher, for example by identifying more points of said object in said sub window. For example, it is possible to fit said sub set of 3D positions in a very short sub window to said first set of 3D positions, as long as said sub set of 3D positions has a sufficient number of points for such a fitting.

Preferably, the method may further comprise combining said second set of 3D positions with a fourth set of 3D positions (e.g. wherein said fourth set of 3D positions is within a third time window), for example in case said second set of 3D positions does not have enough points for fitting to a dense set of 3D positions e.g. said first set of 3D positions. Alternatively, said method may further comprise combining said first and second time windows and points thereof, or combining any other time windows to one another.

Preferably, the method may further comprise the step of storing a dense set of data, for example said first set of 3D positions and/or said first set of locations, in at least one memory element. For example, to use said dense set of data for fitting or matching thereto. For example, said dense set of data is an aggregation of sets of locations in a series of time windows, wherein said series of time windows is as many as to allow said dense set of data to comprise for example at least 50% of points of at least one object in said scene, preferably at least 80%, more preferably at least 90%, most preferably at least 95%. Said step may also comprise storing sparse sets of data, or other data. Such storing may be done locally or in a cloud based storage location.

Preferably, the method may further comprise the step of updating said dense set of data. For example, at a time window much later than said first time window, a new set of dense data may be obtained e.g. a new first set of locations, for example especially if the object has significantly moved and/or rotated. The same steps for obtaining a new set of locations is done, after which said dense set of data is updated, after which further fitting or matching and triangulating based on said new first set of locations or new set of 3D positions, is done.

Preferably, the method steps comprise the step of defining a first set of contour lines by the outermost points of said first set of 3D positions and defining a second set of contour lines by the outer most points of said second set of 3D positions. Said contour is for example defined by joining said outermost points of said first or second set of 3D positions with each other to form a contour of said object. Said second set of contour lines is then transformed into said third set of contour lines by determining a transformation such that said third or transformed second set of contour lines matches or fits said first set of contour lines. Contour lines may be advantageous and more accurate for fitting than a group of points, due to having been defined using a larger set of 3D positions. The method steps therefore preferably comprise the step of fitting said second set of contour lines to said first set of contour lines.

The use of the Lissajous trace as discussed above is advantageous in defining said second set of locations in a better way, since after a few or several Lissajous lines, many points in said second set of locations are identified, and based on which said second set of 3D positions and subsequently said second set of contour lines are defined, wherein said second set of contour lines gets better defined with more Lissajous lines and longer identification windows of said second set of locations. This embodiment is better illustrated in FIG. 6. Alternatively, said first and second set of contour lines may be defined by said first and second set of locations in 2D, after which said first and second set of contour lines are converted to 3D.

Figure 6:
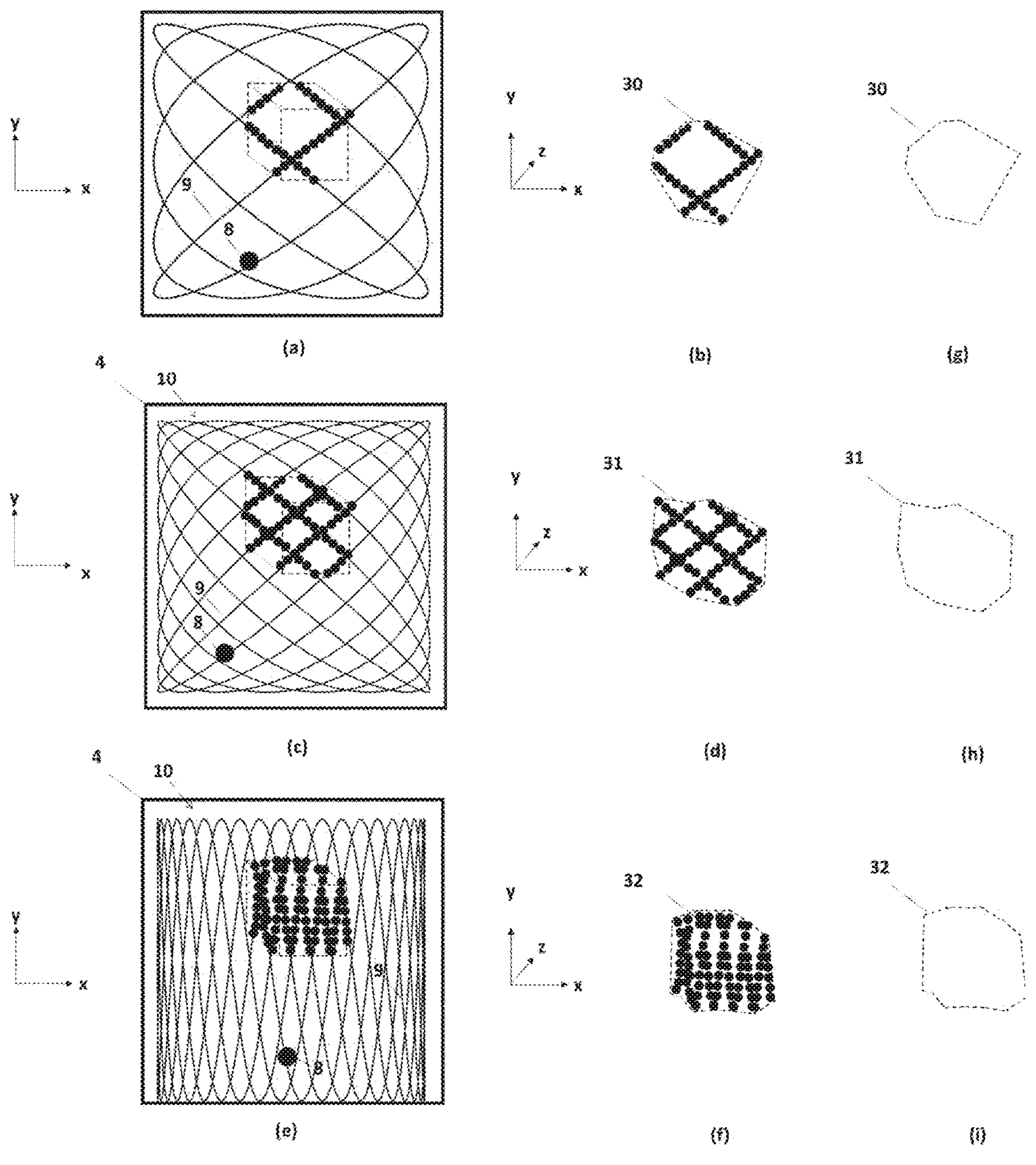
FIG. 6 shows in (a) identifying points along a Lissajous trace (10), wherein said points are used to define a second set of contour lines (30) in (b), and shows in (c, e) identifying points along a denser Lissajous trace (10), wherein said points are used to define a first set of contour lines (31) and a fourth set of contour lines (32) in (d, f), according to embodiments of the present invention.

The contour lines of this embodiment describe the lines defining the outermost points of an object, for example the outline of an object, as shown in FIG. 6. This allows object segmentation e.g. to know where each object, e.g. by drawing a set of contour lines around said object.

Preferably, the method steps may further comprise the step of extrapolating a predicted set of 3D positions for an upcoming time instance or time window based on said second set of 3D positions and said first set of 3D positions, wherein said extrapolation comprises identifying a trajectory of said object between said first time window and said second time window. For example, if a trajectory of an object is moving to the right direction between said first and second time window, then it is still expected to move further towards the right direction in said upcoming time instance. Furthermore, the speed of movement of said object can be estimated between said first time window and said second time window, which is used to better extrapolate said predicted set of 3D positions for said upcoming time instance or time window.

This is advantageous in predicting movement of objects beyond said first and second time window, before actually occurring. The method steps may further comprise the step of identifying a real set of 3D positions. Said real set of 3D positions may comprise only a few points of an object, for example said real set of 3D positions corresponds to a partial identification of points of said object. The method steps may further comprise the step of validating said predicted set by at least partial comparison with said real set. Said real set of 3D positions is only used for validation purposes. For example, to verify whether said object has not changed its trajectory or speed of movement.

This is further advantageous in filtering out false positives and inaccurate identifications of points. For example, if an object is confirmed to have moved in a certain direction at a certain speed, then identification of points away from said predicted set of 3D positions is likely a false positive, unless in case it relates to another object in said scene.

In a second aspect, the present invention relates to an optical sensor for SLAM. The system comprises a first plurality of pixel sensors, wherein each pixel sensor comprising a photo detector. The photo detectors of said first plurality are adapted to output a second set of locations of points of at least one object in a scene within a second time window, with respect to said first plurality. For example, with respect to a point in the middle of said first plurality.

The sensor further comprises a processing unit. The unit is adapted to convert said second set of locations to a second set of 3D positions. Said second set of 3D positions may thereafter be stored in a random access memory of said unit, and retrieved whenever needed.

The unit comprises a processor determining in use (e.g. capable of determining) a transformation of said second set of 3D positions, such that said second set of 3D positions is a best fit to a first set of 3D positions. For example, determining a translation and/or rotation of said second set of 3D positions corresponding to a translation and/or rotation of an object in a scene, with respect to said first plurality of pixel sensors. This is preferably done continuously. As shown in the method of the first aspect, transformation is advantageous in allowing to obtain low latency and high efficiency method, and subsequently a low latency and a high efficiency sensor. The sensor is therefore capable of mapping objects in said scene and localizing said first plurality of pixel sensors with respect to said objects. The sensor may include a set of instructions that, when executed by the processor, executes the method of the first aspect.

Said first set of 3D positions is denser than said second set of 3D positions. Said first set of 3D positions is within a first time window prior to said second time window. Said second time window is shorter than said first time window, preferably at least two times shorter. Said first set of 3D positions is preferably retrieved from a storage location, such as preferably a local or cloud-based storage location.

Preferably, said photo detectors of said first plurality are further adapted to output a first set of locations of points of said at least one object in said scene within said first time window, wherein said unit is further adapted to convert said first set of locations to said first set of 3D positions.

Preferably, the unit is capable of supplementing said second set of 3D positions with said first set of 3D positions. This allow to construct said second set of 3D positions, after which said unit may be connected to means for producing an image of said scene.

Preferably, the pixel sensors may be arranged in a plurality of rows and/or a plurality of columns. For example, the pixel sensors may be arranged in a matrix configuration. Such arrangement allows detection of a larger area. Preferably, each photo detector may be a single-photon detector, for example a single photon avalanche diode (SPAD).

Preferably, each detector may be arranged in a reverse biased configuration. The detector is capable of detecting photons impinging thereon. The detector has an output for outputting an electrical detection signal upon detection of a photon. For example, a detection signal may be represented by a signal comprising logic ‘1’ e.g. a detection, while no detection signal may be represented by a signal comprising logic ‘0’ e.g. no detection. Alternatively, a detection signal may be represented by or result in a pulse signal, e.g. a transition from logic ‘0’ to logic ‘1’, then a transition back from logic ‘1’ to logic ‘0’, while no detection may be represented by or result in an absence of such a pulse signal.

Preferably, points in said first set of 3D positions are at least twice as much as in said second set of 3D positions, preferably at least five times as much, more preferably at least ten times as much, even more preferably at least twenty times as much, most preferably at least fifty times as much. This is because said first time window is longer than said second time window, for example more points of said object have been identified in said first time window.

Preferably, the sensor further comprises primary optics able to produce an image of said scene on said first plurality of pixel sensors.

In a third aspect, the present invention relates to an optical sensing device for SLAM comprising said optical sensor according to the second aspect.

The device further comprises at least one light source. Said light source is adapted to illuminate at least one dot on said scene along an illumination trace. Said device further comprises a second plurality of pixel sensors, each pixel sensor comprising a photo detector. Said second plurality is preferably identical to said first plurality. For example, the first and second plurality may preferably have the same number of pixel sensors in the same configuration. However, said first and second plurality are not located at the same position. For example, said first plurality is shifted along the x-axis from said second plurality. This allows triangulation of the outputs of the first and second plurality of pixel sensors, to obtain depth information of the scene, as will be explained below. Preferably, the light source is adapted to be in a wavelength detectable by the pixel sensors. For example, between 100 nanometer and 10 micrometer, preferably between 100 nanometer and 1 micrometer.

Said photo detectors of the first plurality are adapted to monitor said dot. Said detectors are further adapted identify and output said first and second set of locations along said trace. Similarly, said photo detectors of the second plurality are adapted to monitor said dot and output a third set of locations of points of said object along said trace within said first time window and a fourth set of locations of points of said object along said trace within said second time window, with respect to said second plurality.

The unit is capable of triangulating said first and third sets of locations to obtain said first set of 3D positions, and wherein said unit is further capable of triangulating said second and fourth sets of locations to obtain said second set of 3D positions.

A light source is advantageous in allowing triangulation. For example, using said light source illuminated on a scene (e.g. an environment), and said first and second plurality of pixel sensors e.g. oriented differently than each other, wherein said first and second plurality have a shared field of view of the scene, it is possible to convert x-y-time data of the two sensors to x-y-z-time data by triangulation. For example, by adapting said light source to illuminate a dot on said scene in an illumination trace, wherein said dot scans said scene (preferably continuously), wherein said first and second plurality monitor said dot and output locations of points of at least one object (e.g. points of surfaces of said object) in said scene along said trace at a plurality of instances, wherein the x-y-time data of the first and second plurality can be converted to x-y-z-time data using triangulation. The light source may act for example as a reference point, such that said locations of said points of said object of the first plurality can be synchronized with those of the second plurality, to create the z-dimension.

Preferably, the sets of 3D positions may be filtered, for example to reduce the number of pixels with false detections, and only triangulate data of pixels with a true detection. For example, checking the detection of the neighboring sensing units (e.g. pixels), or checking the persistence of the detections over time, for example as described in PCT IB2021 054688, PCT EP2021 087594, PCT IB2022 000323, and PCT IB2022 058609. This is an in-pixel filtering mechanism. Another filtering mechanisms may be also available, for example after projecting the detections on a periphery, it is possible to remove some noisy detections, since the pattern of projection is known e.g. Lissajous or the like. For example, filtering may be based on expected pulse width, expected dot projection size, past detection(s) and current detection(s) of the pixel and its neighboring pixel(s). The detected signal is thereafter outputted on row and column signal busses, allowing to know the locations (i.e. the x, y coordinates) of the laser dot at each time stamp. For example, filtering is done based on past bus information to identify detection locations with highest likelihood of having detected photons originating from active illumination.

Preferably, the light source advantageously illuminates and scans a scene to be imaged in a Lissajous fashion or pattern. This illumination trajectory is advantageous in allowing efficient and fast image detection, since after several illumination cycles, a significant part of the image is already illuminated. Other illumination patterns may be envisaged, such as raster scan or the like.

Preferably, the first and/or second plurality of pixel sensors may comprise more than 100 sensors, preferably more than 1,000 sensors, more preferably more than 10,000 sensors, even more preferably more than 100,000 sensors, most preferably more than 1,000,000 sensors. For example, the first and/or second plurality of pixel sensors may be arranged in a matrix fashion, wherein said first and/or second plurality comprises 1,000 pixel sensor rows and 1,000 pixel sensor columns.

Preferably, said device further comprises at least one memory element, wherein said element is adapted to store at least said first set of 3D positions and/or said second set of 3D positions. For example, wherein said first set of 3D positions has at least twice as much data points of said object as said second set of 3D positions. Said memory element may also store other data, such as said first and/or second set of locations and/or said third set of 3D positions.

Preferably, said unit is capable of extrapolating a predicted set of 3D positions for an upcoming instance based on said second set of 3D positions and said first set of 3D positions, wherein said unit is capable of identifying a trajectory of said object between said first time window and second time window, wherein said unit is further capable of validating said predicted set by comparing with a real set of 3D positions.

In a fourth aspect, the present invention relates to an optical sensing system for SLAM, comprising said optical sensing device according to the third aspect. The system further comprises secondary optics able to produce an image of said scene on said second plurality of pixel sensors.

Said image for example comprises said at least one object in said scene. The system is capable of constructing an image of said scene with low latency, since the sensor is capable of constructing a second set of 3D positions comprising a few data points of said object, based on a first set of 3D positions comprising many data points of said object, as shown in the first and second aspect.

Preferably, the system may be used for 3D vision applications. For example, the system is used to visualize objects in three dimensions. For example, said at least one optical sensor may allow said vision.

Any feature of the second (i.e. sensor), third (i.e. device), and fourth (i.e. system) aspects may be as correspondingly described in the first aspect (i.e. method).

In a fifth aspect, the present invention relates to use of a method according to the first aspect, and/or a sensor according to the second aspect, and/or a device according to the third aspect, and/or a system according to the fourth aspect, for sensing e.g. optical sensing, preferably for SLAM.

Further characteristics and advantages of embodiments of the present invention will be described with reference to the figures. It should be noted that the invention is not restricted to the specific embodiments shown in these figures or described in the examples, but is only limited by the claims.

FIG. 1 shows in (a, b) a first set of locations (1) and a second set of locations (2) of points of an object (3). Said sets of locations (1, 2) are identified in 2D. The first set of locations (1) is identified within a first time window (T1). Said locations (1) are with respect to a first reference point (28), wherein said first reference point (28) is for example a system performing the method of the present invention, or for example a camera of said system. The second set of locations (2) is identified within a second time window (T2) later than said first time window (T1). FIG. 1 also shows that the first time window (T1) is much longer than the second time window (T2). This allows the first set of locations (1) to be much larger than the second set of locations (2). For example, more points are identified in said first set of locations (1) than in said second set of locations (2), since identification time i.e. in the first time window (T1) is much more than in the second time window (T2). Said sets of locations (1, 2) are converted then from 2D to 3D, as shown in FIG. 1 (c, d). For example, the first set of locations (1) is converted to a first set of 3D positions (5), and the second set of locations (2) is converted to a second set of 3D positions (6). After that, said second set of 3D positions (6) is fitted or matched to said first set of 3D positions (5). For example, by transforming said second set of 3D positions (6) to a third set of 3D positions (7), such that said third set of 3D positions (7) is fitted or matched to said first set of 3D positions (5), in such a way that said third set of 3D positions (7) fits said first set of 3D positions (5) in the best way. Fitting or matching is done on the level of the whole group of points, and not by mapping point by point. Therefore, the number of points in said second set of 3D positions (6) should be large enough to allow for a correct and accurate mapping (e.g. by having a large enough second time window (T2)), but small enough to allow low latency and fast process of mapping. After matching or fitting is successfully done, the transformation that is needed to obtain such successful fitting is determined. For example, how far away was said second set of 3D positions with respect to said first set of 3D positions (i.e. how much did the object move), and how much is the orientation change between of said second set of 3D positions with respect to said first set of 3D positions (i.e. how much did the object rotate).

After mapping is successfully done, said second set of 3D positions (6) is supplemented by said first set of 3D positions (5), For example, said first set of 3D positions (5) allow said second set of 3D positions (6) to be as complete as said first set of 3D positions (5).

FIG. 2 shows in (a, b) a first set of locations (1) and a second set of locations (2) of points of an object (3). A moving dot (8) generated by a light source (27) is illuminated on a scene (4) along an illumination trace (9), in this case said illumination trace (9) is in a Lissajous fashion (10), but it can also be in other fashions. The density of the lines of said trace (9) in said scene (4) is related to the time window in which said dot (8) has moved in said scene (4). The more the moving dot (8) scans said scene (4), the more the density of lines, and the more points of said object (3) identified along the trace (9) of said dot (8). As shown, the number of points along said trace (9) in the first time window (T1) is more than the number of points along said trace (9) in the second time window (T2), simply because said time window (T1) is longer than said second time window (T2). The first and second sets of locations (1, 2) are identified with respect to a first reference point (28). A third set of locations (11) and a fourth set of locations (12) are identified with respect to a second reference point (29), which is different than said first reference point (28), for example said first and second reference points (28, 29) are distanced from one another. As shown in FIG. 2 (c, d), the third and fourth set of locations (11, 12) show the object (3) having a slightly different orientation than in FIG. 2 (a, b), since the reference point is different. By triangulating said first and third set of locations (1, 11), a first set of 3D positions (5) is obtained, as shown in FIG. 2 (*e*). Similarly, by triangulating said second and fourth set of locations (2, 12), a second set of 3D positions (6) is obtained. Triangulation allows to obtain depth information of a set of locations (1, 2, 11, 12), to obtain said first and second sets of 3D positions (5, 6). After that, similarly to what has been explained in FIG. 1, the second set of 3D positions (6) is matched to the first set of 3D positions (5).

FIG. 2 (*g*) shows another way of matching or fitting, based on a first set of lines (33) of said first set of 3D positions (5), and a second set of lines (34) of said second set of 3D positions (6). The first set of lines (33) is a dense set of lines, defined by a dense set of data points of said object (3). The first set of lines (33) comprises lines that are made by joining consecutive points of said first set of 3D positions (5). Similarly, said second set of lines (34) is obtained. After that, a third set of lines (35) is calculated by transforming said second set of lines (34), such that said third set of lines (35) is fitted or matched to said first set of lines (33) in a best way possible. Matching two sets of lines may be easier, faster, and more accurate than matching two group of points. Furthermore, said second or third set of lines (34, 35) may be supplemented by said first set of lines (33).

Figure 3:
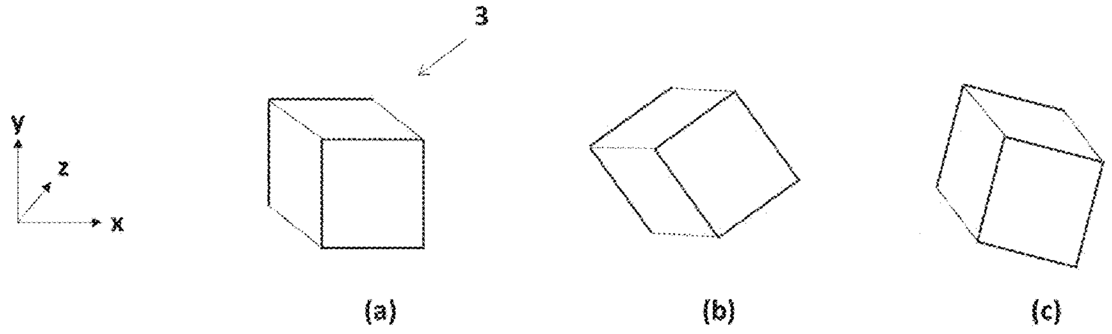
FIG. 3 shows in (a, b, c) an object (3) having different orientations, according to embodiments of the present invention.

FIG. 3 shows in 3D an object (3) having different orientations. The orientation is calculated with respect to a reference orientation, for example with respect to a system that is performing the method. Calculating the orientation is useful for matching the third set of 3D positions (7) to the first set of 3D positions (5). Calculating the orientation is important since at least some points in the second set of 3D positions (6) may be hidden due to change of orientation, in which case matching said second or third set of 3D positions (6, 7) to said first set of 3D positions (5) should be adjusted accordingly.

Figure 4:
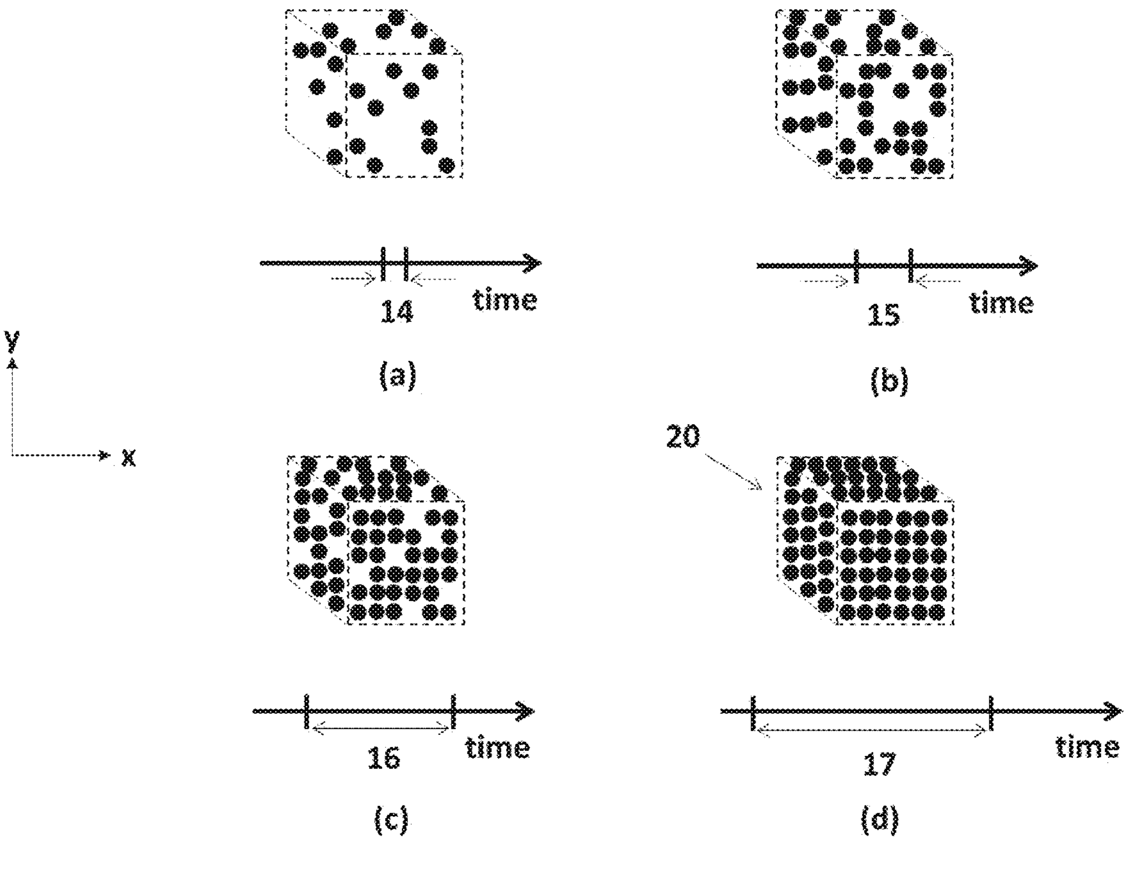
FIG. 4 shows points of an object (3) identified over four time windows with different widths (14, 15, 16, 17), wherein a dense set of data (20) is obtained for the longest time window (17), according to embodiments of the present invention.

FIG. 4 shows points of an object (3) identified over four time windows having different widths (14, 15, 16, 17). Time window (14) is the shortest, while time window (17) is the longest. It is evident that the longer the time window, the more points are identified. For a sufficiently long time window e.g. the longest time window (17), a dense set of data (20) is obtained. After converting said dense set of data (20) to 3D e.g. by triangulation (as shown above), it serves as an ideal set of data for a sparse set of data to be matched thereto, as well as for providing supplementary 3D positions. However, 3D data obtained within shorter time windows may also be used for matching, for example a 3D set of data obtained within time window (15) may be matched to a 3D set of data obtained within time window (16), as well as (14) to (16), and (14) to (15). In other words, it is not always necessary to match a sparse set of data to a dense set of data, i.e. it may be possible to match a semi-sparse set of data to a semi-dense set of data, or a sparse set of data to a more dense set of data.

Figure 5:
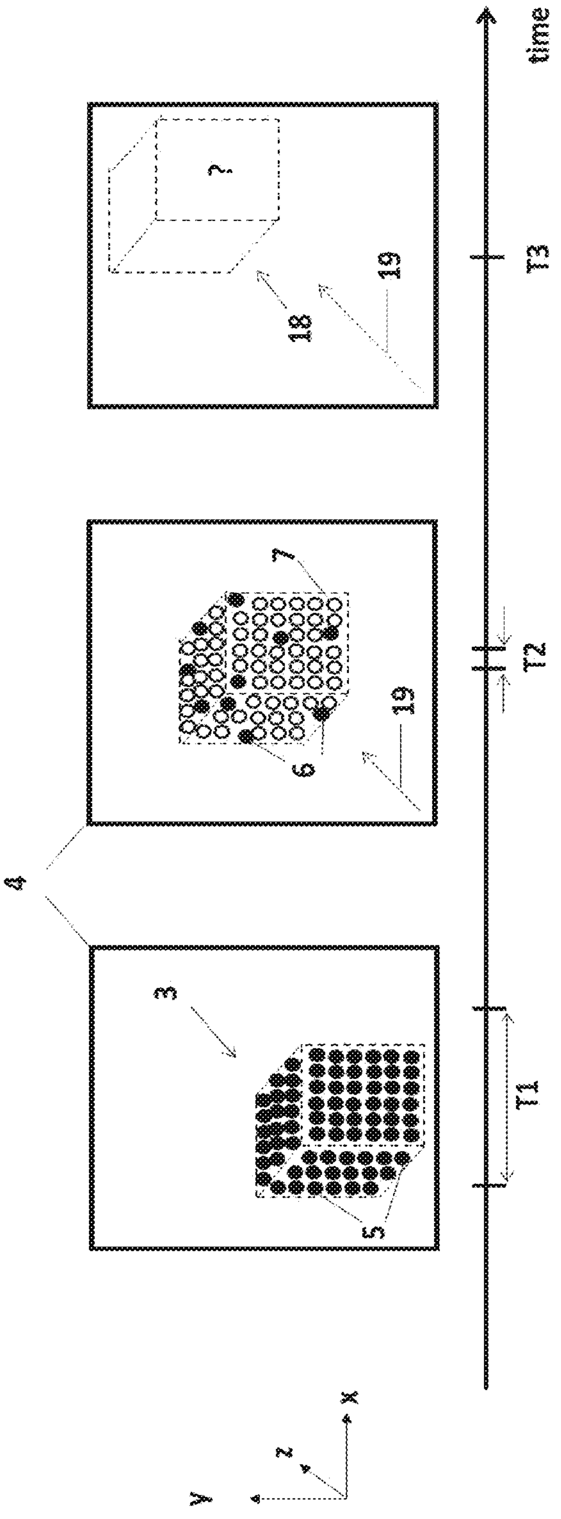
FIG. 5 shows an object (3) moving in a trajectory (19) between said first and second time windows (T1, T2), wherein a predicted set of 3D positions (18) is obtained, according to embodiments of the present invention.

FIG. 5 shows an object (3) moving in a trajectory (19) between the first time window (T1), and the second time window (T2). As explained above, the third set of 3D positions (7) is mapped to the first set of 3D positions (5), after which said first set of 3D (5) positions may be used as supplementary 3D positions (7) to supplement said second set of 3D positions (6). It is desired after that to find out the location of the object (3) and points defining said object (3) at an upcoming time instance (T3) i.e. in the near future, for example after 1 milliseconds. A predicted set of 3D positions (18) is extrapolated based on the trajectory (19) of movement of said object (3) in the past, for example between the first time window (T1) and the second time window (T2). Not only the movement itself, but also the rotation and change of orientation of said object (3), is taken into account to obtain said predicted set of 3D positions (18). For validation purposes, a real set of 3D positions of the object (3) at said upcoming time instance (T3) is identified, for example a partial identification, so as to validate said predicted set by comparison with said real set. It is noteworthy that said extrapolation of said predicted set of 3D positions (18) works better when it is based on more sets of 3D positions, for example at least two sets of 3D positions, for example five sets of 3D positions, for example ten sets of 3D positions, for example wherein identifying points of said objects is done over a longer time period, since this will cause the trajectory (19) to be predicted in a more accurate way.

FIG. 6 shows in (a) identifying points along a Lissajous trace (10). Said points are converted into 3D, and are subsequently used to define a second set of contour lines (30) in (b, g).

Although only some points of said object (3) were identified in FIG. 6 (*a*), said second set of contour lines (30) is indicative of said object. FIG. 6 shows in (c) the same as in (a), however with a denser Lissajous trace (10), for example wherein identifying said points along said trace (10) is done within a longer window in (c) than in (a). By identifying said points defining an object (3) with a denser Lissajous trace (10) in (c), and converting them to 3D, a first set of contour lines (31) is defined in (d, h), which gives a better idea of said object (3) than said second set of contour lines (30). Another Lissajous trace (10) is shown in (e), wherein a fourth set of contour lines (32) is defined in (f, i).

Said second set of contour lines (30) is then matched or fitted to said first set of contour lines (31) or said fourth set of contour lines (32). This matching allows a coarse identification of only some points of said object (3) in said set of second contour lines (30), as shown in FIG. 6 (a, b), to be sufficient for identifying movement and/or rotation of said object (3) between different time windows.

Figure 7:
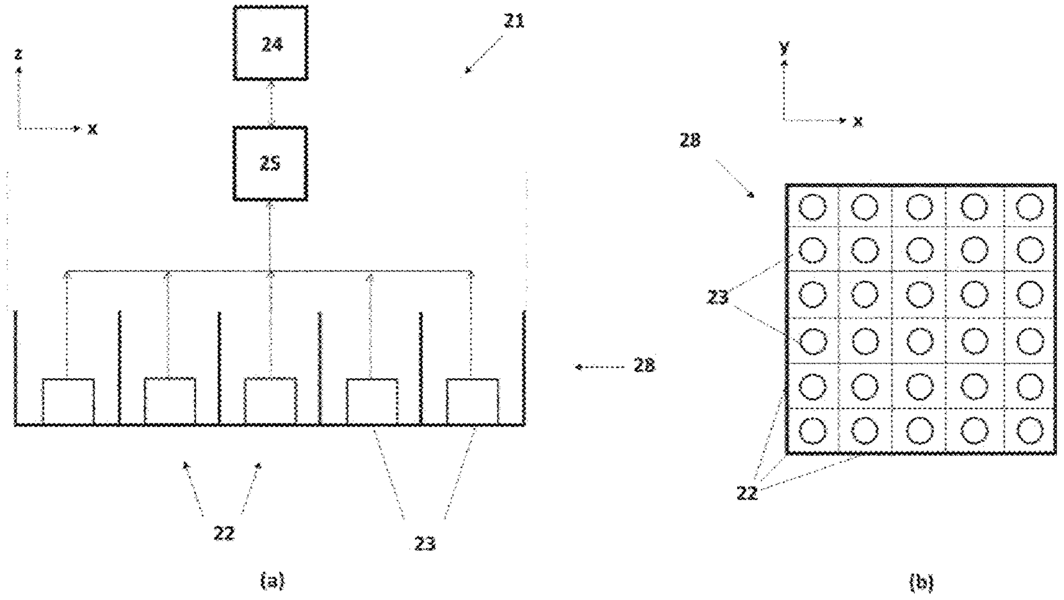
FIG. 7 shows an optical sensor (21), according to embodiments of the present invention.
Figure 8:
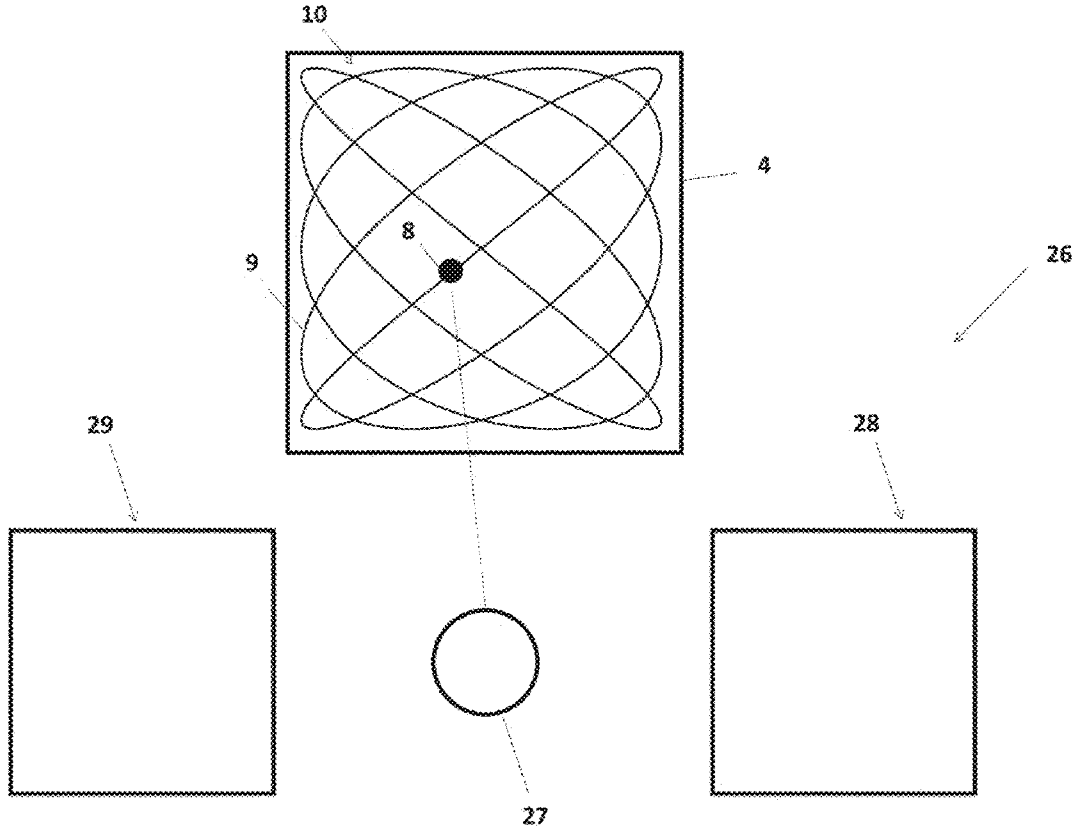
FIG. 8 shows an optical sensing device (26) comprising a first and a second plurality of pixel sensors (28, 29) and a light source (27), wherein said light source (27) illuminates a dot (8) on a scene (4) in a Lissajous fashion (10), according to embodiments of the present invention.

FIG. 7 shows an optical sensor (21) comprising a first plurality (28) of pixel sensors (22), each pixel sensor (22) comprising a photo detector (23). The optical sensor (21) further comprises a processing unit (24), and a memory element (25). Photons impinges on said photo detectors (23), wherein said photo detectors (23) are adapted to output a first set of locations (1) and a second set of locations (2) of an object (3) in a scene (4). The optical sensor (21) is shown as part of the optical sensing device (26) in FIG. 8, wherein a first plurality (28) and a second plurality (29) of pixel sensors (22), as well as a light source (27) are present. The device (26) allows triangulating the first set of locations (1) obtained by the first plurality (28) with a third set of locations (11) obtained by the second plurality (29), and triangulating the second set of locations (2) obtained by the first plurality sensor (28) with a fourth set of locations (12) obtained by the second plurality (29), in order to obtain said first and second set of 3D positions (5, 6). This is done by illuminating said light source (27), wherein said light source (27) illuminates a dot (8) on a scene (4) in a Lissajous fashion (10), and wherein said first and second plurality (28, 29) monitor the said dot (8) and identify said sets of locations (1, 2, 11, 12) along the trace of said dot (8), in this case along the Lissajous trace (10). It is noteworthy that the first and second plurality (28, 29) are not at the same position, for example they are displaced from each other in the x- and/or y-axis, as shown in FIG. 8, to allow said triangulation.

Other arrangements for accomplishing the objectives of the methods and devices embodying the invention will be obvious for those skilled in the art. The proceeding description gives details of certain embodiments of the present invention. It will, however, be clear that no matter how detailed the above turns out to be in text, the invention may be applied in many ways. It should be noted that the use of certain terminology when describing certain characteristics or aspects of the invention should not be interpreted as implying that the terminology herein is defined again to be restricted to specific characteristics or aspects of the invention to which this terminology is coupled.

LIST OF REFERENCE SIGNS

| | | | | | |
|---|---|---|---|---|---|
| T1 | First time window | T2 | Second time window | 1 | First set of locations |
| 2 | Second set of locations | 3 | Object | 4 | Scene |
| 5 | First set of 3D positions | 6 | Second set of 3D positions | | |
| 7 | Third set of 3D positions | 8 | Dot | 9 | Illumination trace |
| 10 | Lissajous | 11 | Third set of locations | 12 | Fourth set of locations |
| 14, 15, 16, 17 | Four time windows having different widths | | | 18 | Predicted set of 3D positions |
| 19 | Trajectory | 20 | Dense set of data | 21 | Optical sensor |
| 22 | Pixel sensor | 23 | Photo detector | 24 | Processing unit |
| 25 | Memory element | 26 | Optical sensing device | 27 | Light source |
| 28 | First reference point or first plurality of pixel sensors | | | | |
| 29 | Second reference point or second plurality of pixel sensors | | | 30 | Second set of contour lines |
| 31 | First set of contour lines | 32 | Fourth set of contour lines | | |
| 33 | First set of lines | 34 | Second set of lines | 35 | Third set of lines |

The invention claimed is:

1. A method for sensing, comprising the steps of:

identifying a second set of locations of points of at least one object in a scene within a second time window, with respect to a first reference point; wherein the second set of locations is in 2D, and converting the second set of locations to a second set of 3D positions, characterized in that the method further comprises the step of:

determining a transformation to the second set of 3D positions, such that the transformed second set of 3D positions is a best fit to a first set of 3D positions, wherein the first set of 3D positions corresponds to a first set of locations, wherein the first set of locations is in 2D, wherein the first set of 3D positions is denser than the second set of 3D positions, and wherein the first set of 3D positions is obtained within a first time window prior to the second time window, and wherein the second time window is shorter than the first time window.

2. The method of claim 1, wherein the method comprises the steps of:

identifying the first set of locations of points of the at least one object in the scene within the first time window, with respect to the first reference point, and converting the first set of locations to the first set of 3D positions.

3. The method of claim 1, wherein the method further comprises the step of supplementing the second set of 3D positions with supplementary points based on the first set of 3D positions.

4. The method of claim 1, wherein the method further comprises the steps of:

illuminating a dot on the scene along an illumination trace, monitoring the dot, identifying the first and the second set of locations along the trace, with respect to the first reference point, identifying a third set of locations along the trace, with respect to a second reference point, within the first time window, identifying a fourth set of locations along the trace, with respect to the second reference point, within the second time window, triangulating the first and third set of locations to obtain the first set of 3D positions, and triangulating the second and fourth set of locations to obtain the second set of 3D positions.

5. The method of claim 1, wherein the method further comprises the steps of:

defining a first set of lines by consecutive points of the first set of 3D positions, defining a second set of lines by consecutive points of the second set of 3D positions, and determining a transformation to the second set of lines, such that the second set of lines is a best fit to the first set of lines.

6. The method of claim 1, wherein the method further comprises the steps of:

dividing the second time window into sub windows, wherein at each of the sub windows, a sub set of 3D positions is identified, and calculating, for each of the sub set of 3D positions, a corresponding transformed set of 3D positions, wherein each of the transformed set of 3D positions is obtained by transforming the second set of 3D positions in the sub window, such that each transformed set of 3D positions is a best fit to the first set of 3D positions.

7. The method of claim 1, wherein the method further comprises the steps of:

extrapolating a predicted set of 3D positions for an upcoming time instance based on the second set of 3D positions and the first set of 3D positions, wherein the extrapolation comprises identifying a trajectory of the object between the first time window and the second time window, identifying a real set of 3D positions, and validating the predicted set by comparing with the real set.

8. The method of claim 1, wherein the method further comprises the step of combining the first and second time windows and points thereof.

9. An optical sensor for simultaneous localization and mapping (SLAM), comprising:

a first plurality of pixel sensors, each pixel sensor comprising a photo detector, and a processing unit, wherein the photo detectors of the first plurality are adapted to output a second set of locations of points of at least one object in a scene within a second time window, with respect to the first plurality, wherein the second set of locations is in 2D, wherein the processing unit is adapted to convert the second set of locations to a second set of 3D positions, characterized in that the processing unit comprises a processor determining in use a transformation to the second set of 3D positions, such that the second set of 3D positions is a best fit to a first set of 3D positions, wherein the first set of 3D positions corresponds to a first set of locations, wherein the first set of locations is in 2D, wherein the first set of 3D positions is denser than the second set of 3D positions, and wherein the first set of 3D positions is within a first time window prior to the second time window, and wherein the second time window is shorter than the first time window.

10. The optical sensor of claim 9, wherein the photo detectors of the first plurality are further adapted to output the first set of locations of points of the at least one object in the scene within the first time window, wherein the processing unit is further adapted to convert the first set of locations to the first set of 3D positions.

11. The optical sensor of claim 9, wherein the sensor further comprises primary optics able to produce an image of the scene on the first plurality of pixel sensors.

12. An optical sensing device comprising the optical sensor of claim 9, wherein the device further comprises at least one light source, wherein the light source is adapted to illuminate at least one dot on the scene along an illumination trace, wherein the device further comprises a second plurality of pixel sensors, each pixel sensor comprising a photo detector, wherein the photo detectors of the first plurality are adapted to monitor the dot and output the first and second set of locations along the trace, and wherein the photo detectors of the second plurality are adapted to monitor the dot and output a third set of locations of points of the object along the trace within the first time window and a fourth set of locations of points of the object along the trace within the second time window, with respect to the second plurality, wherein the processing unit is capable of triangulating the first and third sets of locations to obtain the first set of 3D positions, and wherein the processing unit is capable of triangulating the second and fourth sets of locations to obtain the second set of 3D positions.

13. The optical sensing device of claim 12, wherein the device further comprises at least one memory element, wherein the element is adapted to store at least the first set of 3D positions and/or the second set of 3D positions.

14. The optical sensing device of claim 12, wherein the processing unit is capable of extrapolating a predicted set of 3D positions for an upcoming instance based on the second set of 3D positions and the first set of 3D positions, wherein the processing unit is capable of identifying a trajectory of the object between the first time window and second time window, wherein the processing unit is further capable of validating the predicted set by comparing with a real set of 3D positions.

15. An optical sensing system comprising the optical sensing device of claim 12, wherein the system further comprises secondary optics able to produce an image of the scene on the second plurality of pixel sensors.

16. The method of claim 1, wherein the first reference point is a first viewpoint.

17. The method of claim 1, wherein the second time window is at least two times shorter than the first time window.

18. The method of claim 1, wherein each of the first set of 3D positions and the second set of 3D positions are obtained by triangulating two sets of locations in 2D with respect to two different reference points.

19. The method of claim 4, wherein the second reference point is a second viewpoint.

20. The sensor of claim 9, wherein the processing unit is adapted to obtain each of the first set of 3D positions and the second set of 3D positions by triangulating two sets of locations in 2D with respect to two different reference points.

* * * * *